United States Patent [19]

Delisle et al.

[11] 4,100,428

[45] Jul. 11, 1978

[54] CONTROL SYSTEM FOR LIMITING THE ELECTRICAL CONSUMPTION OF A DISTRIBUTION NETWORK

[75] Inventors: Jules Delisle; Adrien Leroux, both of Sherbrooke; Serge Mathieu, Ste-Foy, all of Canada

[73] Assignee: H.O.P. Consulab Inc., Beauport, Canada

[21] Appl. No.: 696,415

[22] Filed: Jun. 15, 1976

[30] Foreign Application Priority Data

Feb. 6, 1976 [CA] Canada .................................. 245766

[51] Int. Cl.² ........................ H05B 1/02; H01H 37/00
[52] U.S. Cl. ...................................... 307/97; 307/34; 307/117; 307/126; 219/485; 236/91 E
[58] Field of Search .............. 307/125, 126, 130, 131, 307/117, 113, 116, 141, 29, 31, 35, 39, 38, 62, 96; 236/91 D, 91 E; 219/483, 485, 486

[56] References Cited

U.S. PATENT DOCUMENTS

| | | | |
|---|---|---|---|
| 3,714,453 | 1/1973 | Delisle | 307/39 |
| 3,787,729 | 1/1974 | Bennett | 307/117 |
| 3,789,236 | 1/1974 | Lacroix | 307/126 |

Primary Examiner—Gene Z. Rubinson
Assistant Examiner—William L. Feehey
Attorney, Agent, or Firm—Cushman, Darby & Cushman

[57] ABSTRACT

The control system permits limiting the electrical demand of a distribution network to a desired maximum value by regulating the temperature of one or more thermal loads with heating or cooling elements; this system includes: means for measuring the instantaneous demand of the network; means for measuring the instantaneous temperature of each of the thermal loads; means for comparing the demand of the network to the desired maximum value; means for comparing the measured temperature to the desired temperature for each of the thermal loads; and means for disconnecting or for connecting in response to the information obtained by the comparison, a fraction of the elements which is proportional to the difference between the measured temperature and the desired temperature.

14 Claims, 9 Drawing Figures

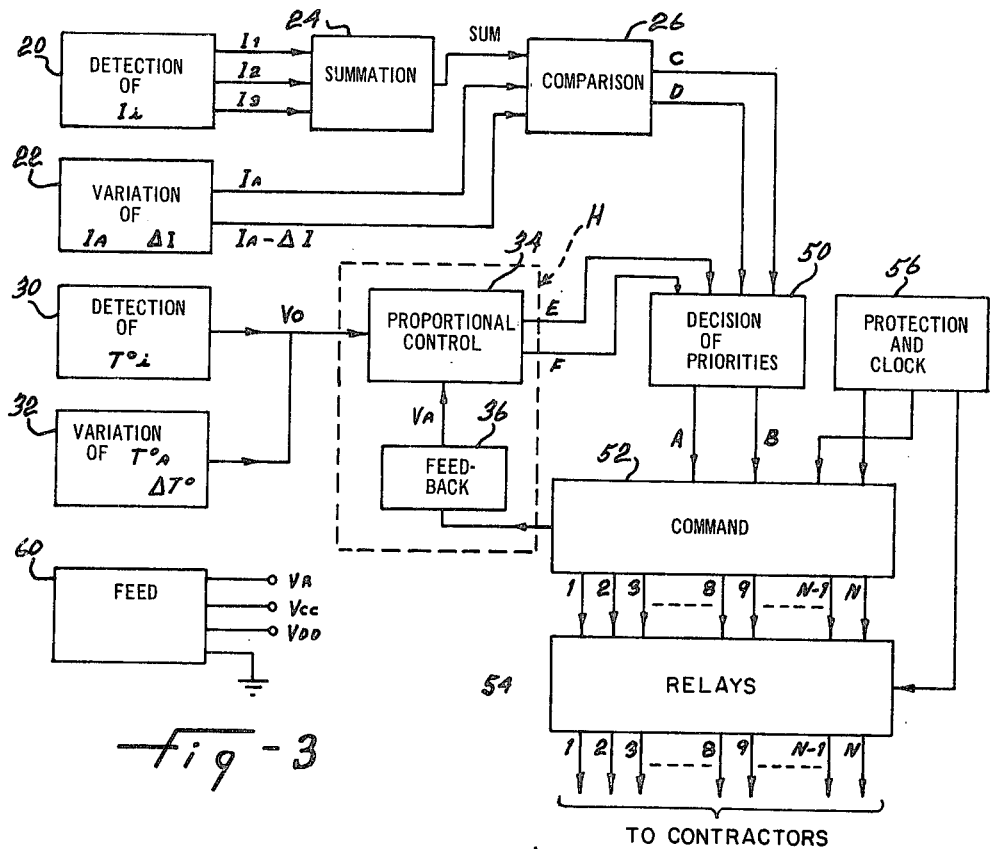
_fig-3_
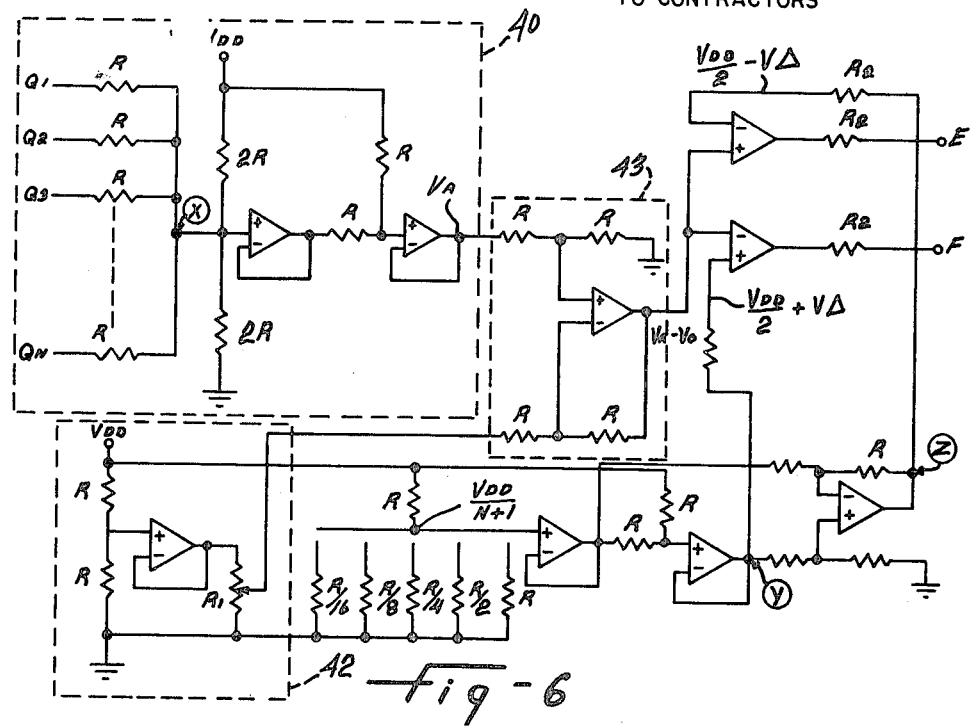
_fig-6_

CONTROL SYSTEM FOR LIMITING THE ELECTRICAL CONSUMPTION OF A DISTRIBUTION NETWORK

FIELD OF THE INVENTION

This invention relates to a control system designed to maintain any matter (water, air, or other thermal loads) at a constant temperature determined by the user with electrical heating or cooling elements, while at the same time limiting the power dissipated in the complete electrical installation to a predetermined and adjustable value.

BACKGROUND OF THE INVENTION

Most existing temperature control systems operate in the following fashion: a temperature sensitive element, which includes a means for adjusting to the desired temperature, operates a switch when the difference between the instantaneous temperature and the desired temperature, also called the set temperature, exceeds a certain value. This method of operating does not allow a proportional control of the temperature because there is only one possible way to control the loads, that is they may be on or off.

OBJECTS OF THE INVENTION

The object of this invention is to provide a proportional control of the temperature, that is when the controlled temperature only varies slightly, only a fraction of the load (heating or cooling elements) proportional to the difference between the measured temperature and the desired temperature is turned on. If the deviation increases, a second load is added and thus in this way more and more loads are connected as the measured temperature moves further and further away from the desired temperature.

This method of operating a temperature controller offers an interesting secondary aspect that well serve the desired goal. In effect, if the calculation of the heat losses for the system whose temperature it is wished to keep constant, have been performed correctly, the whole heating or cooling capacity should only be used on very infrequent occasions.

Practical experience and probabilities demonstrate that around 70% of the loads are sufficient to maintain a constant temperature under normal operation. As a result, it follows that this method of operating a temperature controller helps to limit the peak loads in an electric network, because unlike conventional control systems, it is rare that 100% of the heating or cooling devices would be used for a relatively long period.

SUMMARY OF THE INVENTION

The present invention relates to a control system which allows limitation of electrical demand in a distribution network to a desired maximum value while controlling the temperature of one or more thermal loads by means of heating and/or cooling elements, including: the means of measuring, instantly, the power demand in the network; the means of instantly measuring the temperature of each of the thermal loads; the means of comparing the measured demand of the network to the maximum desired value; the means of comparing the measured observed temperature of each of the thermal loads to the desired temperature for each of the thermal loads; and the means of connecting or disconnecting a fraction of the heating or cooling elements which will be determined by the information obtained by comparison and which will be proportional to the difference between the measured temperature and the desired temperature.

The invention will be better understood after reading the following description and operation of one embodiment of a system using a proportional temperature control in accordance with the present invention. This description is however given only as an example and should not limit the claims made. The description will refer to the drawings in which:

Figure 4:
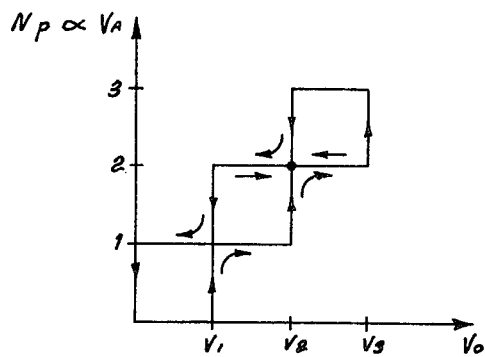
Figure 5A:
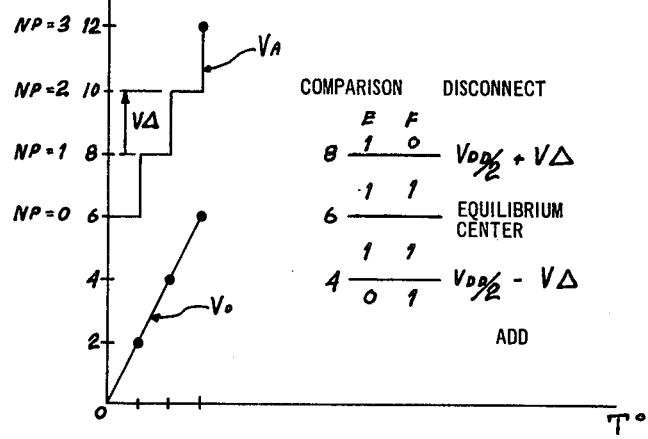
Figure 5B:
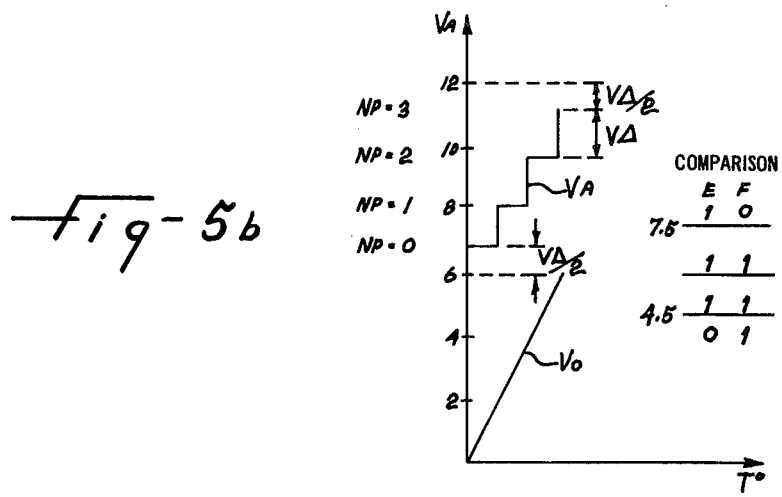
Figure 7:
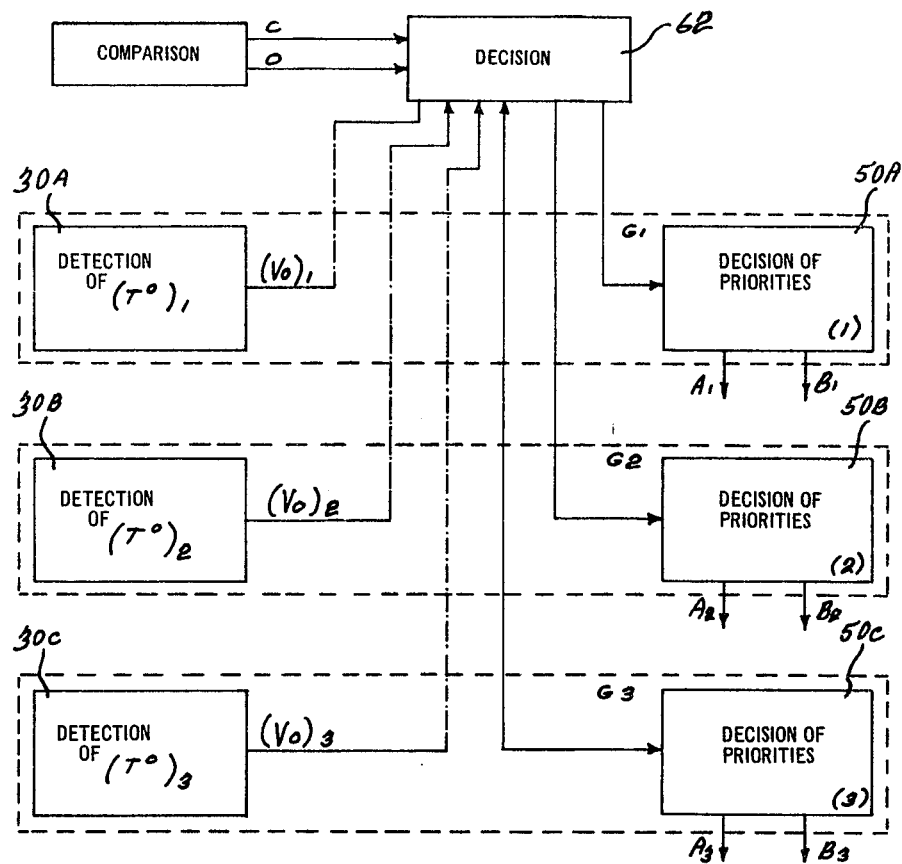
Figure 5C:
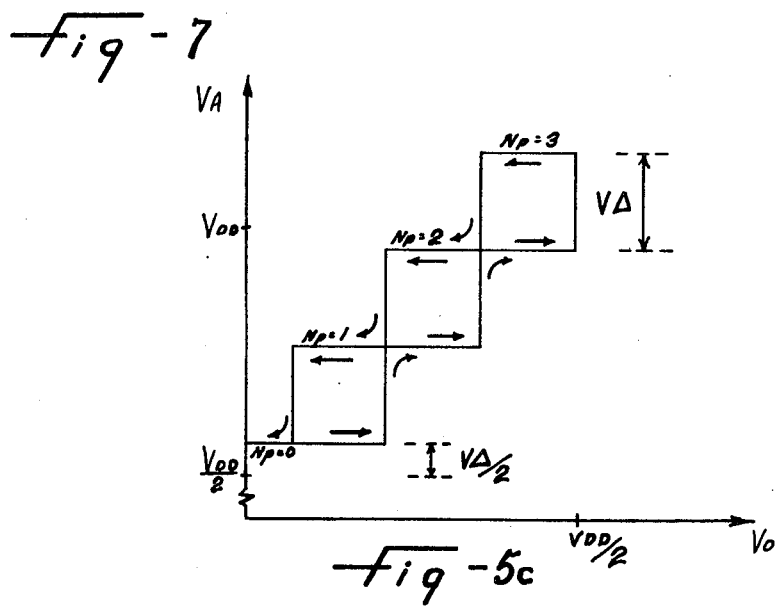

FIG. 3 gives the functional diagram of the proportional control system;

FIG. 4 is the theoretical curve of the proportional control as a function of the generated voltages;

FIGS. 5a and 5b show two variations of $V_A$ as a function of the observed temperature;

FIG. 5c shows the hysteresis curve of the control system;

FIG. 6 is the circuit diagram of one version of the proportional control and the feedback;

FIG. 7 shows a part of a circuit of FIG. 3 in the case where we have more than one thermal load.

DESCRIPTION OF PREFERRED EMBODIMENT

Figure 1:
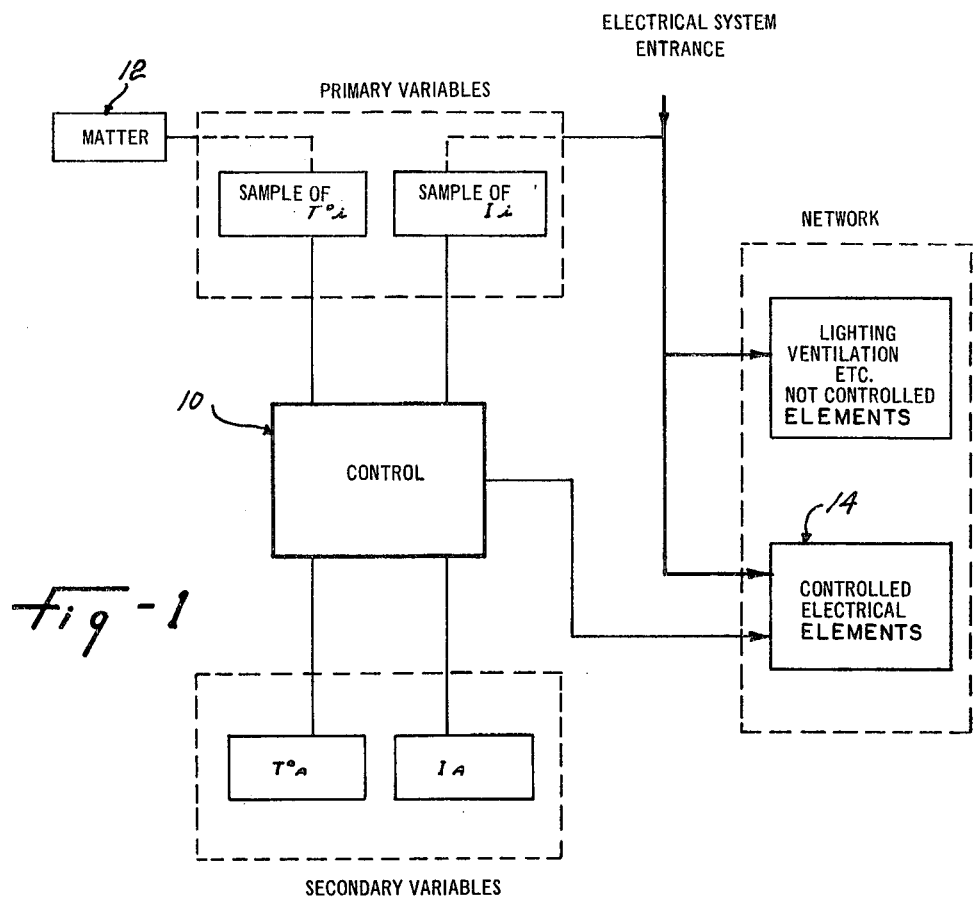
FIG. 1 is a flow chart of a system based on the present invention.

In referring to the flow chart illustrated in FIG. 1, the control system 10 functions to maintain any substance 12 (water, air or other thermal loads) at a constant temperature $T°_a$, determined by the user, by means of heating or cooling elements, using electrical energy, all in order to limit the power used in a total electrical installation at a value determined and adjustable that will be called $I_a$. (The present invention is concerned with the power demand which can be evaluated or approximated by the value of the current; therefore, notation I will be used throughout the following description with any value associated with the power demand such as current or a voltage representing a current). The control system operates on the information received as primary input variables that are the present temperature $T°_i$ of the thermal load and the instantaneous power $I_i$ of the whole network. In the flow chart, the secondary variables are $T°_a$, the desired temperature of the thermal load, and $I_a$, the maximum power demand of the distribution system. The outputs are the electrical heating or cooling elements (14), that will be connected or disconnected depending on the relative state of the four primary and secondary inputs.

The following description refers uniquely to electrical heating loads, however it is understood that electrical cooling loads might also be used by making the appropriate changes to the table and the following relations.

In applying the proposed system, the relationships that exist between the input variables and the control of the exits could be summarized by the following table for each thermal load:

|   | $(T°_a - T°_i)$ | $(I_a - I_i)$ | Operation |
|---|---|---|---|
| 1 | <0 | <0 | Disconnect |
| 2 | <0 | =0 | Disconnect |
| 3 | <0 | >0 | Disconnect |
| 4 | =0 | <0 | Disconnect |
| 5 | =0 | =0 | No action |

-continued

| | $(T°_a - T°_i)$ | $(I_a - I_i)$ | Operation |
|---|---|---|---|
| 6 | =0 | >0 | No action |
| 7 | >0 | <0 | Disconnect |
| 8 | >0 | =0 | No action |
| 9 | >0 | >0 | Connect |

According to the relations 7 and 8 of the functional logic table, priority is given to the fixed limit of of demand $I_a$. When the present temperature is lower than the temperature that should be maintained, but at the same time the present demand is larger than the specified maximum demand, elements are disconnected. By disconnecting the electrical element, and therefore reducing the present demand, eventually relation 8 of the table will apply. And a little later relation 9 will apply, because of a reduction in the power demand of the uncontrolled portion of the system.

With this reasoning, it can be concluded that the value of $I_a$ must be slightly larger than the average demand of the uncontrolled elements. The peaks in power demand which occur frequently in industrial electrical installations will be reduced and considerable economy will result because electricity is often charged for on the basis of peak demand, either instantaneous or averaged over some time period.

In this case when $I_a - I_i > 0$, the relations 2 and 3 indicate that the temperature determines the control. In effect, relation 3 shows that even if the present demand is below the fixed limited demand, that is to say when electric elements could be connected the heating elements are disconnected because the measured temperature tends to be larger than the maintained temperature. To avoid this, the heating elements are kept disconnected. For the same reason, the response of the control circuit in relations 1 and 2 is to disconnect.

The relations 5 and 6 indicate that the response of the control circuit is to do nothing and these are desirable states, because in these conditions $T°_a = T°_i$ and this is what is wanted. However, in relation 4, the priority is determined by the demand for the various reasons previously mentioned.

The four input variables serve therefore to indicate to the command circuit the operations to be performed. It is the method of operating the command circuit that makes this control system proportional. Such a proportional temperature control must function according to the characteristic curve of FIG. 2, in which the represented line generator may be expressed by the following relations:

| | | |
|---|---|---|
| $L = 100\%$ | for | $T°_i < T°_a - \Delta T°$ |
| $L(\%) = \dfrac{(T°_a - T°_i) \, 100}{\Delta T°}$ | for $T°_a - \Delta T° \leq T°_i \leq T°_a$ | |
| $L = 0\%$ | for | $T°_i > T°_a$ | in which L represents the fraction of the loads which are connected and $\Delta T°$ the spread in degrees of the scale of operation according to the present invention, this straight line generator has been expressed by subdividing it into a series of steps (six in number) associated one to one to a heating or cooling element. N, therefore represents the number of loads (heating or cooling elements) that the system must control; this number is identical to the number of positions contained in the command circuit. As a result, when the temperature to be maintained drops only slightly, only a fraction, proportional to the difference between the desired temperature and the measured temperature, of the loads are connected.

Block 20 depicts the means used to detect the actual demand $I_i$ of the electrical system and, to make it useful, the detection section of I transforms it into a voltage which is called $I_i$. The outputs $I_1$, $I_2$, and $I_3$, represent the currents (or the voltages representing these currents) in the connections of a three phase network. Block 22 depicts the means that are used to indicate the values $I_a$ and $\Delta I$: $I_a$ represents the upper limit of demand of the electrical network above which the charges must be disconnected (this value is transformed into a voltage that is proportional to $I_a$); $\Delta I$ is the variation of $I_i$ caused by connecting the largest controlled load and is also a reference voltage which takes into account this variation.

As an index for the instantaneous power demand, the current is used. For a new installation, it is possible to use a conventional current measuring transformer, however since this device should be applicable to existing installations, the use of a ring transformer with a core that can be opened is to be preferred. In the case where the primary feed is more than say 600 Volts, the openable core current transformers can measure the current in the secondary of the existing current transformers.

The information obtained by the type of transformer used is an alternating voltage with an amplitude of several hundred millivolts. The functional diagram of FIG. 3 shows that the voltages must be added (block 24) this summation gives the total demand of a multiphase system and is compared (block 26) at two points of reference $I_a$ and $I_a - \Delta I$. It is preferable to have constant voltages as reference points. Therefore, each of the terms of the summation is also a constant voltage. The rectification of the voltage signal of the input current could cause certain problems due to the small amplitude of the signal obtained. The use of passive elements could produce an unacceptable error and to obtain good precision it is preferable to use an active rectification circuit that has a voltage transfer function that is as close as possible to that of an ideal rectifier for the voltage, current and frequency range being considered.

The role of the current detection system is to obtain voltages which are constant, filtered, and proportional to the input current.

The user should be able to set the maximum demand for his electrical distribution network. This can be readily accomplished by varying the voltage which is proportional to $I_a$ in the comparison circuit. This voltage $I_a$ can be varied from OV to $V_{dd}$ corresponding to zero demand and to a demand corresponding to 100% of the system's capability.

The circuit must take into consideration an additional parameter $\Delta I$ in order to avoid unproductive oscillation of the loads. By definition, $\Delta I$ is the variation of the current in the input of the network caused by the largest controlled load. If $I_a$ is the maximum total allowed above which loads must be disconnected, a zone is defined with an upper limit of $I_a$ and lower limit of $I_a - \Delta I$ where no action will be taken by the circuit. This is an equilibrium zone.

These considerations clarify the relations 2, 5, and 8 in the above table. The zone called $I_a - I_i = 0$ in this table now corresponds to the zone $I_a - \Delta I \leq I_i \leq I_a$. However because the expression $I_a - I_o = 0$ is simple and has the same meaning, it will continue to be used to denote the equilibrium zone.

The outputs of the variation circuit of $I_a$ and $\Delta I$ should thus be two votages which will be compared to the voltage $I_i$(block 26). These two voltages are proportional to $I_a$ and $I_a - \Delta I$ and therefore define three zones of operation for $I_i$:

| Definition | Name | Values of C | D | Operation |
|---|---|---|---|---|
| $I_i < I_a - \Delta I_1$ | $I_a - I_i > 0$ | 0 | 0 | Connect |
| $I_a - \Delta I < I_i < I_a$ | $I_a - I_i = 0$ | 1 | 0 | No action |
| $I_i > I_a$ | $I_a - I_i < 0$ | 1 | 1 | Disconnect |

The block 30 represents the means used to measure the value of $T°_i$ the present or instantaneous temperature, and is detected by a thermostat like one of those which exists on the market.

The block 32 represents the means which are employed to fix the value of $T°_a$, the desired temperature or the temperature to be set on the thermostat, and also $\Delta T°$ which is the range over which the potentiometer can affect a complete turnabout.

An example of a thermostat is one composed of a diaphragm operated by the pressure of a fluid which is submitted to the variations of the temperature to be detected, and a system of levers which operates a potentiometer. The thermostat provides adjustments for $T°_a$ and for $\Delta T°$ which defines the range of operation for proportional control and is in effect the spread in degrees required for the potentiometer to affect a complete turnabout.

For example if $T°_a$ is fixed at 180° and $\Delta T°$ at 24°, the potentiometer will operate from 156 to 180°. And according to the curve of FIG. 2, if the control is to be operated with six loads, the first load will be connected when the temperature is 176°, the second at 172°, the third at 168°, and so on.

Figure 2:
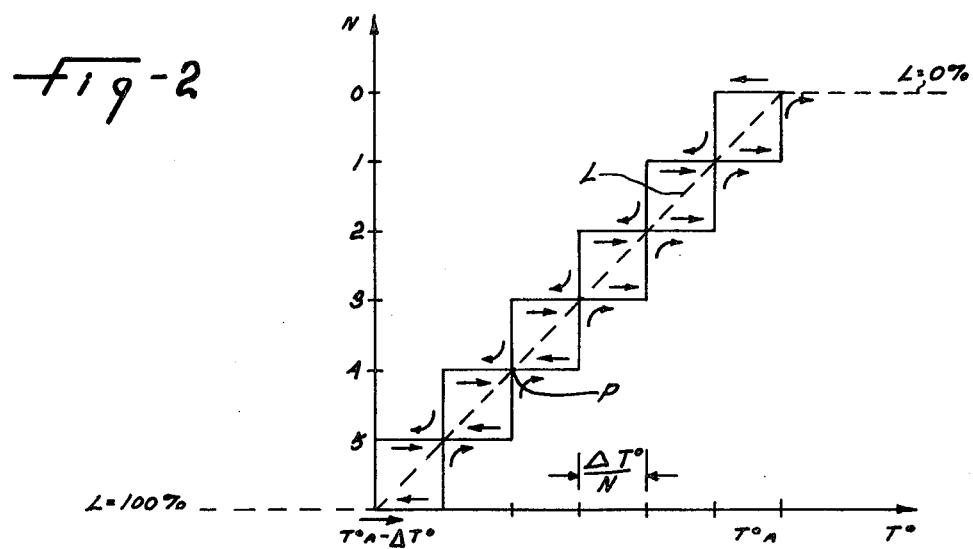
FIG. 2 is the theoretical curve of the proportional control system.

It should be noted that because of the hysteresis curves of FIG. 2, the third load will be disconnected this time at 172°, the second at 176° and the first at 180°, so as to make the system stable when $T°_i = T°_a$. Changes of $T°_a$ bring about a translation along the abscissa of the curve of FIG. 2, whereas the changes of $\Delta T°$ bring about a rotation of the straight line generator around a point $T°_a$.

A description of the proportional control, represented by block 34 from which comes the information E and F, will now be given by referring to FIG. 4. It should first be noted that $V_o$, which is the voltage generated by the thermostat, varying between $O_v$ to $V_s$, is an analogue voltage, while $N_p$, which is the number of loads that are connected, is an integer variable. A voltage $V_a$ must be developed that varies according to $N_p$. This is the function of the feedback section indicated by block 36 of FIG. 3. The comparison of $V_o$ and $V_a$ determines the action to take, either connect or disconnect.

The curve is a curve of hysteresis by steps. For more versatility and precision, this curve should be able to distribute the loads over the entirety of the range of the potentiometer of the thermostat, and must also supply a number of loads connected to the control system. Since this number of loads can vary from one use to another, the circuit, to be versatile, must be able to easily vary its number of steps. We can do this by using a programmed system for N that numerically calibrates the reference voltage as described further on.

In FIG. 4, assume $V_o$ is increased from the point $V_1$, 1. Between $V_1$ and $V_2$, there is no action, when the difference between $V_a$ and $V_o$ varies until it is equal to the height of a step of $V_a$. At this point, i.e. at point $V_2$, 1, an action is taken, and the voltage $V_a$ increases to point 2. The same method is followed to go to point $V_3$,3 and the same for all the other steps.

From $V_3$,3 suppose that the voltage $V_o$ is lowered to $V_2$. At this point $[V_a - V_o] - [V\Delta](C\Delta$ represents the absolute value of the step $V_a$) and an action is taken. The voltage $V_a$, by feedback is lowered to point $V_a = 2$, and the system returns to equilibrium.

The following logical sequence can be deduced. There is no equilibrium when $[V_a - V_o] \geq V\Delta$ and therefore an action must occur to change $V_a$ in such a manner that $[V_a - V_o] > V\Delta$ which is an equilibrium point. The center of the equilibrium level occurs at $V_a - V_o = 0$. The voltage $V\Delta$ will therefore be a reference voltage to which $V_a - V_o$ will be compared; it will have a value equal to the voltage range of $V_a$ divided by the number of steps N desired.

We therefore have a functional circuit by operating in the following manner:

1 — Close the feedback loop which will generate a step ramp starting from $V_a = 0$ to $V_a = V_{dd}$ for $N_p = 0$ to $N_p = N$, $V_{dd}$ representing some voltage.
2 — Make $0 \leq V_o \leq V_{dd}$ and change $V_a - V_o$.
3 — Define $V\Delta$ equal to a step in $V_a$.
4 — Establish two comparison points $+V\Delta$ and $-V\Delta$ to which $V_a - V_o$ will be compared. These three possible states of the comparison:

$$V_o < V_a - \Delta V$$

$$V_o - \Delta V \geq V_o \geq V_a + \Delta V$$

$$V_o + \Delta V < V_o$$

define, respectively, the three possible actions to be taken;

Connect
No Action
Disconnect

Nevertheless, this method of operating has unwanted secondary effects, because $V_a - V_o$ can be smaller than zero. To simplify the circuit, all the operational amplifiers are fed at ·18 and 0 Volts only. Negative results from the subtraction of two voltages are therefore to be avoided.

The means used to resolve this problem is to vary $V_a$ from $V_{dd}/2$ to $V_{dd}$, and to vary $V_o$ from 0 to $V_{dd}/2$. In this way, $V_a - V_o$ will always be positive. However, the equilibrium level will be $V_{dd}/2 \pm V\Delta$. FIG. 5a allows us to visualize the operation.

By varying $V_o$, the subtraction $V_a - V_o$ is caused to occur. The result is then entered into the comparison levels to determine what action to take. However, because of inaccuracies which are inherent in any system, it could happen that when $V_a = 8$ and $V_O =$, $V_a - V_o$ would be slightly less than 8, and the same phenomena could happen for $V_a = 10$ and $V_o = 6$ except that in this case $V_a - V_o$ would be slightly larger than 4. In each of these situations, a load would not be controlled, because of $V_a - V_o \leftarrow 8$, the point of comparison falls in the equilibrium level and $N_p$ would never be zero. For the same reason, it could happen that $N_p$ could never be N.

To overcome this obstacle, N + 1 steps must be defined on the curve $V_a$, by making $V\Delta/2$ volts the first step, as in FIG. 5b, where $V\Delta = V_{dd}/(2N + 2)$ which transforms the hysteresis curve into the one given in FIG. 5c.

The circuit which will perform all of the functions must be able to generate a voltage $V_a$ varying from $(V_{dd}+V\Delta/2)$ to $V_{dd}-(V\Delta/2)$ according to $N_p$, a voltage $V_o$ varying from 0 to $V_{dd}/2$, an operation $V_a-V_o$, two comparators that would yield the outputs E and F (FIG. 3) having as inputs $V_a-V_o$ to be compared with $V_{dd}/2 \pm V\Delta$.

Since the number of controlled loads N can vary with the user, it is necessary that the generation of $V_a$ can be made by the same single circuit whatever the value of N. According to what has been described of FIG. 5b, the equation for $V_a$ is:

$$V_a = \frac{V_{dd} + V\Delta + (N_p \times 2V\Delta)}{2}$$

which can also be written:

$$V_a = \frac{V_{dd} + V\Delta + (N_p \times 2V\Delta)}{2}$$

where $$V\Delta = \frac{V_{dd}}{2N + 2}$$

$V_a$ is therefore the average of two voltages that are respectively $V_{dd}$ and $V\Delta + N_p \times 2V\Delta$.

Now $V\Delta + N_p \times 2V\Delta =$ $$\frac{V_{dd}}{2(N+1)} + \frac{N_p \times V_{dd}}{N+1} = \frac{V_{dd}(N_p + \frac{1}{2})}{N+1}$$

which is also equivilant to:

$$\frac{V_{dd} \times N_p + 0(N - N_p) + V_{dd}/2}{N+1}$$

This equation is in effect the average of N + 1 voltages where $V_{dd} \times N_p + 0(N - N_p)$ represents the N terms and $V_{dd}/2$ represents the supplementary term.

The solution is now immediate, for the command section can supply N voltages of which $N_p$ would be $V_{dd}$ and $N - N_p$ would be 0 volts. To obtain $V_a$, it remains to calculate the average of the N voltage and $V_{dd}/2$ and to average the result with $V_{dd}$.

Referring to FIG. 6, the circuit contained in the dotted lines 40 generates $V_a$ and offers the important advantage of the possibility of expansion, because the only thing to be done is to put the feedback information coming from the outputs Q1 to $Q_n$ of the command section at the same point X of FIG. 6 and $V_a$ is automatically generated no matter what the N.

The generation of $V_o$ is simplier, because the only requirement is that $V_o$ varies from 0 to $V_{dd}/2$. The circuit included in the dotted lines 42, in which $R_1$ is the potentiometer of the thermostat creates $V_o$. The circuit represented by the dotted lines 43 performs the subtraction $V_a-V_o$.

This voltage $V_a-V_o$ must be compared to two points of reference that are $V_{dd}/2 + V\Delta$ and $V_{dd}/2 - V\Delta$ to achieve the logic of the outpus E, F of FIG. 3 in the following manner:

| Equations | Outputs E | F | Operation |
|---|---|---|---|
| $V_{dd}/2 - V\Delta > V_a - V_o$ | 1 | 0 | Disconnect |
| $V_{dd}/2 - V\Delta < V_a - V_o < V_{dd}/2 + V\Delta$ | 1 | 1 | No Action |
| $V_{dd}/2 + V\Delta < V_a - V_o$ | 0 | 1 | Connect |
| $V\Delta = \dfrac{V_{dd}}{2N + 2}$ | | | |

It is now necessary to generate the comparison voltages that are a function of N according to the expression for $V_a$ shown above.

$$\frac{V_{dd}}{2} \pm V\Delta = \frac{V_{dd} \pm V_{dd}/(N+1)}{2}$$

$$\frac{V_{dd} + V_{dd}/(N+1)}{2}$$

is the average of two voltages $V_{dd}$ and $V_{dd}/N + 1$ at the point Y of FIG. 6. And $$\frac{V_{dd} + V_{dd}/N + 1}{2} - \frac{V_{dd}}{N+1} = \frac{V_{dd}}{2} - V\Delta$$

at point Z.

To preserve the ease of expansion of the system, it is necessary that $V_{dd}/(N+1)$ be generated readily. The basis of this generation is a voltage divider made up of two series resistances R and $R_x$ such that: where $$\frac{V_{dd}R_x}{R + R_x} = \frac{V_{dd}}{N+1} \longrightarrow R_x = \frac{R}{N}$$

If N is made up of $N_1+N_2$, an interesting possibility suggests itself because as is shown below $R/(N_1+N_2)$ can be generated by placing two resistances of value $R/N_1$ and $R/N_2$ in parallel:

$$\frac{\frac{R}{N_1} \times \frac{R}{N_2}}{\frac{R}{N_1} + \frac{R}{N_2}} = \frac{\frac{R}{N_1N_2}}{\frac{R(N_1+N_2)}{N_1N_2}} = \frac{R}{N_1+N_2}$$

In the same way it can show that 3 or more resistances of the values $R/N_1$, $R/N_2$, $R/N_3$ .. $R/N_n$ connected in parallel give a value $$\frac{R}{N_1 + N_2 + N_3 + \ldots N_n}$$

If the values of $N_1$, $N_2$, $N_3$ and so forth are chosen to be 1,2,4,8,16 it is possible to combine these 5 resistances to obtain all values of N from 1 to 31, in the same way as in a numerical binary system.

A generation circuit for $V_{dd}/N + 1$ is made up then of at most six resistances as shown in FIG. 6, having values of R, R/2, R/4, R/8 and R/16. The parallel connection of these resistances will give the desired response R/N where N is made up of the different possible sums between the numbers 1,2,4,8 and 16.

For example, when the system has 11 heating elements for a load, we should have:

$$\frac{V_{dd}}{12} \longrightarrow R_x = \frac{R}{N} = \frac{R}{11}$$

and R/11 is synthesized by putting R/8, R/2 and R in parallel. In effect, $8+2+1 = 11$. In the same way, a system carrying 23 loads should be programmed by connecting R/16, R/4, R/2 and R in parallel, and so forth.

The block 50 of FIG. 3 shows the techniques used to decide on the priorities of the command circuit in determining its actions based on a comparison of the actual values of $I_i$ and $T°_i$ to $I_a$ and $T°_a$ respectively.

The logic of these inputs and outputs is represented in the following table:

| INPUTS | | | | OUTPUTS | | |
|---|---|---|---|---|---|---|
| C | D | E | F | A | B | OPERATION |
| 1 | 1 | 1 | 0 | 1 | 0 | Disconnect |
| 1 | 0 | 1 | 0 | 1 | 0 | Disconnect |
| 0 | 0 | 1 | 0 | 1 | 0 | Disconnect |
| 1 | 1 | 1 | 1 | 1 | 0 | Disconnect |
| 1 | 0 | 1 | 1 | 1 | 1 | No Action |
| 0 | 0 | 1 | 1 | 1 | 1 | No Action |
| 1 | 1 | 0 | 1 | 1 | 0 | Disconnect |
| 1 | 0 | 0 | 1 | 1 | 1 | No Action |
| 0 | 0 | 0 | 1 | 0 | 1 | Connect |

The two outputs A and B of the decision circuit are given to the command circuit 52 that is used to connect or disconnect the elements. It also closes the loop formed by blocks 52 - 36 - 34 of the feedback necessary to form the curve of FIG. 2. The outputs A and B determine the action to be taken according to the following logic:

| A | B | COMMAND |
|---|---|---|
| 0 | 1 | Connect |
| 1 | 1 | No Action |
| 1 | 0 | Disconnect |

The command circuit is formed of flip-flops the signals of which are then amplified to command the actuators 54 that are connected to the heating elements. These actuators adapt the logic signals that came from the command section to the power relays on which the loads are connected. An amplifier, connected to each flip-flop output, is necessary to activate the relays.

Since the command section is made up of electronic flip-flops; a power failure could put the whole system in an unacceptable state. When the power returns, all the flip-flops will be zeroed to force their output to zero, thus disconnecting all the loads. A thermal protection could be used to make the contacts of the relay inoperable, thus disconnecting the loads if the temperature should rise above $T°_a$ because of a failure in the control system.

Block 56 represents the protection circuit and a clock that activates the flip-flops at fixed intervals, therefore connecting or disconnecting the loads at predetermined frequencies.

The feed circuit 60 must supply the system with the voltages necessary for its operation. First, there is $V_{cc}$ that feeds the operational amplifiers. This voltage doesn't need to be regulated nor does it have to be highly filtered. The second output is called $V_{dd}$ and the only reason this voltage needs to be regulated is that it is directly related to $I_a$ and $\Delta I$. The third voltage $V_r$ feeds the output relays. p The inputs $G_1, G_2, G_3$ of blocks 50a, 50b, 50c, of FIG. 7 are used to expand the system to control several independent thermal loads. In this case, the blocks 30, 32, 34, 36, 50, 52, 54, and 56 of FIG. 3 are repeated as often as the number of thermal loads to be controlled, but the blocks 20, 22, 24, 26 and 60 of FIG. 3 are used for the entire system, and are not repeated.

The additional functions to be performed in this case are the following: if the demand of the whole electrical network is below the permitted limit, the different heating elements of each thermal load act independantly according to the information supplied by their own $T°_i$'s and $T+_a$'s. In these circumstances, one can consider that one has two or more independent proportional controls each having the same allowable limit of consumption.

However, if the actual demand approaches or exceeds the allowable limit, then block 62 of FIG. 7 would establish a priority for the specific thermal charge according to the following logic:

Disconnect the heating elements of the thermal load whose $T°_i$ is closest to its $T°_a$.

Connect the heating elements of the thermal load whose $T°_i$ is furthest from its $T°_a$.

If temperature deviations are equal, the elements are connected in order.

The logic of the inputs and outputs for a value of G ($G_1$, $G_2$, $G_3$ etc.) may be represented by the following table:

| INPUTS | | | | | OUTPUTS | | |
|---|---|---|---|---|---|---|---|
| C | D | E | F | G | A | B | OPERATION |
| 1 | 1 | 1 | 0 | 0 | 1 | 0 | Disconnect |
| 1 | 0 | 1 | 0 | 0 | 1 | 0 | Disconnect |
| 0 | 0 | 1 | 0 | 0 | 1 | 0 | Disconnect |
| 1 | 1 | 1 | 1 | 0 | 1 | 0 | Disconnect |
| 1 | 0 | 1 | 1 | 0 | 1 | 1 | No Action |
| 0 | 0 | 1 | 1 | 0 | 1 | 1 | No Action |
| 1 | 1 | 0 | 1 | 0 | 1 | 0 | Disconnect |
| 1 | 0 | 0 | 1 | 0 | 1 | 1 | No Action |
| 0 | 0 | 0 | 1 | 0 | 0 | 1 | Connect |
| 1 | 1 | 1 | 0 | 1 | 1 | 0 | Disconnect |
| 1 | 0 | 1 | 0 | 1 | 1 | 0 | Disconnect |
| 0 | 0 | 1 | 0 | 1 | 1 | 0 | Disconnect |
| 1 | 1 | 1 | 1 | 1 | 1 | 1 | No Action |
| 1 | 0 | 1 | 1 | 1 | 1 | 1 | No Action |
| 0 | 0 | 1 | 1 | 1 | 1 | 1 | No Action |
| 1 | 1 | 0 | 1 | 1 | 1 | 1 | No Action |
| 1 | 0 | 0 | 1 | 1 | 1 | 1 | No Action |
| 0 | 0 | 0 | 1 | 1 | 1 | 1 | No Action |

What is claimed is:

1. A control system for limiting the electrical demand of a distribution network to a maximum predetermined value while regulating the temperature of one or more thermal loads by connecting and disconnecting a number of heating or cooling elements, comprising:

means for measuring the instantaneous demand of said network;

means for comparing the measured demand of said network to said predetermined maximum value;

means for measuring the instantaneous temperature of each said thermal load;

means for determining, for each said thermal load, the difference between the measured temperature and a precetermined temperature for said load;

means for establishing a proportional relation between said difference and the number of elements in a connected state;

priority decision means for determining action to be taken on the connection or disconnection of a number of said elements in response to information received from said comparing means and said relation establishing means: and means for connecting or disconnecting said number of said elements in response to a decision derived from said priority decision means.

2. A system as defined in claim 1, in which heating elements are disconnected when the temperature to be maintained for a thermal load is higher than the instantaneously measured temperature of said load and, at the same time, the electrical demand to be maintained for said network is smaller than the instantaneous demand of said network.

3. A system as defined in claim 1, in which heating elements are disconnected when the temperature to be maintained for a thermal load is lower than the instantaneously measured temperature for said load and, at the same time, the demand to be maintained for said network is higher or equal to the instantaneous demand of said network.

4. A system as defined in claim 1, in which no action is taken when the temperature to be maintained for a thermal load is higher than the instantaneously measured temperature of said load even if, at the same time, the electricl demand to be maintained for said network is equal to the instantaneous electrical consumption of said network.

5. A system as defined in claim 1, in which heating elements are disconnected when the temperature to be maintained for a thermal load is smaller than the instantaneously measured temperature of said load even if the electrical demand to be maintained for said network is equal to the electrical demand of said network.

6. A system as defined in claim 1, in which said relation establishing means operate according to a straight line generator expressed by the following relation:

$$L\% = \frac{(T°_a - T°_i) \, 100}{\Delta T°}$$

for $$T°_a - \Delta T° \leq T°_i \leq T°_a$$

in which:

$L\%$ represents in percent a fraction of the elements connected;

$\Delta T°$ is a temperature range in degrees in which a proportional control of said thermal load is done;

$T°_a$ represents the temperature to be maintained for said thermal load; and $T°_i$ represents the measured temperature of said thermal load; the straight line generator being approximated by subdividing it in a series of steps associated, one to one, to a heating or cooling element.

7. A system as defined in claim 6, in which said temperature range is adjustable.

8. A system as defined in claim 6 in which said measuring means include current transformers containing openable cores, thus permitting installation thereof directly on a cable without having to interrupt current feed.

9. A system as defined in claim 8, further comprising a clock for activating flip-flops at fixed intervals thus permitting the electrical elements to be connected or disconnected at a given frequency.

10. A system as defined in claim 9, further comprising a command circuit made up of a flip-flops, the signals of which being amplified in order to allow command of actuators connected to said elements, said actuators serving to adapt logic signals coming from said command circuit to power relays to which said elements are connected.

11. A system as defined in claim 9, containing a protection circuit permitting the zeroing of the flip-flops after a power failure or if the temperature is too high.

12. A system as defined in claim 1, containing more than one thermal load, wherein if said instantaneous demand of said network approaches or surpasses an allowable demand, the heating elements of the thermal load whose instantaneous temperature is the closest to the predetermined temperature are disconnected and the heating elements of the thermal load whose instantaneous temperature is the furthest from the predetermined temperature are connected.

13. A system as defined in claim 1, containing more than one thermal load, wherein if said instantaneous demand is below an allowable demand, the heating elements of each thermal load act independently according to the information received concerning their respective instantaneous and predetermined temperatures.

14. A control system as defined in claim 1, wherein said priority decision means includes means for causing the element most recently connected or disconnected to be the first to be disconnected or connected.

* * * * *